Sept. 27, 1938.　　　　J. A. KOHL　　　　2,131,377
GRATER
Filed Nov. 24, 1936
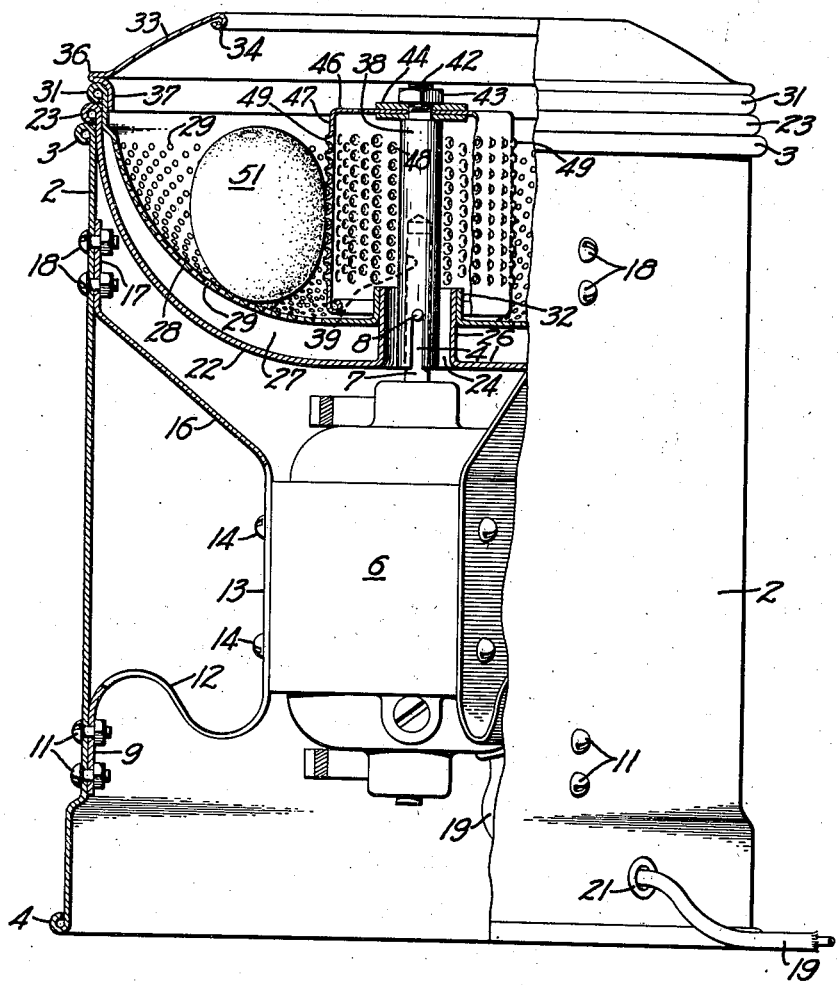
INVENTOR
Joseph A. Kohl
BY
Harry G. Schroeder
ATTORNEY Patented Sept. 27, 1938

2,131,377

UNITED STATES PATENT OFFICE 2,131,377

GRATER

Joseph A. Kohl, Oakland, Calif.

Application November 24, 1936, Serial No. 112,541

1 Claim. (Cl. 146—177)

This invention relates to devices for grating substances, and has particular reference to devices for removing, in comminuted form, the rind of aciduous fruits such as limes, lemons or oranges.

It is an object of the invention to provide a power driven device for disentegrating the skin of the objects previously mentioned which will not rupture a large proportion of the oil cells of the skin.

Another object of the invention is to provide a device of the character described in which the fruit is maintained by gravity in contact with the grating element.

A further object of the invention is to provide, in such a device, means for segregating the comminuted rind into separate receptacles.

Still another object of the invention is to provide in such a device, means whereby the grating element cannot become clogged with material removed from the object being grated, centrifugal force acting to keep the grating element clear at all times during the operation of the device.

Another object of the invention is to provide a device of the character described which may be readily disassembled for cleaning.

Yet another object of the invention is to provide the motor which drives the grating element in such a device with an improved mounting whereby vibration is damped out.

A still further object of the invention is to provide a grater in which the fruit is at all times in view of the operator so that the latter may view the progress of the removal of the rind and stop the machine before the grating proceeds too far and causes the removal from the fruit of undesirable portions of the rind.

The invention possesses other objects and valuable features, some of which, together with the foregoing will be specifically set forth in the detailed description of the invention hereunto annexed. It is to be understood that the invention is not to be limited to the particular species thereof shown and described as various other embodiments thereof may be employed within the scope of the appended claim.

Referring to the drawing:

The figure is a view, partly in front elevation and partly in vertical section, showing the complete grater of my invention.

In detail, the grater comprises a tubular sheet metal housing 2 provided at its upper open end with a rolled rim 3 and at its lower end with a similar rim 4. Disposed concentrically with the housing is a motor 6 having an upwardly extending shaft 7 provided with a pin 8 extending transversely therethrough. The motor is resiliently mounted in the housing by a plurality, preferably three, of supports each comprising a strip of light spring metal having a lower foot 9 which is secured to the inner surface of the housing, adjacent the lower end thereof, by screws 11, an S-shaped arm 12 extending inwardly toward the center of the housing, a vertically disposed portion 13, which is attached by screws 14 to the motor 6, an outwardly and upwardly extending arm 16, and an upper foot 17 which is attached to the inner surface of the housing, adjacent the upper end of the latter, by screws 18. The resilient arms serve to permit limited movement of the motor axially and transversely of the axis of its shaft 7 so as to absorb shocks such as that produced by the torque of the motor frame at the instant of starting and will also resiliently resist any tendency of the motor to vibrate during operation. A suitable electric conductor 19 connected within the motor 6 may be brought out of the housing through a suitable bushing 21 and provided with the usual plug by means of which the conductor may be connected to a convenient outlet of electric current.

Extending downwardly into the open upper end of the housing 2 is a pan 22 substantially hemispherical in cross-section and provided at its top with a rolled rim 23, which engages the rim 3 of the housing and thereby limits the downward movement, and consequently fixes the position, of the pan within the housing, and at the center of its bottom with an aperture 24, through which the motor shaft 7 projects, having a peripheral rim 26 rising therefrom.

Positioned within the pan 22, and spaced from the inner surface thereof so as to provide a chamber 27 is a bowl 28, similar in cross-sectional form to the pan 22, provided with apertures 29 to provide a screen and which permit communication between the recess of the bowl and the chamber 22 between the bowl and pan. The bowl is also provided at its top with a rolled rim 31, which fixes the location of the former relative to the pan, and with a central aperture, having a peripheral flange 32 rising therefrom, in slidable engagement with which is the pan flange 26. A cover 33 having a large central aperture, bordered by a rolled rim 34, overlies the top of the bowl and is provided with a rim 36 having a flange 37 depending therefrom which snugly fits within the bowl at the rim of the latter.

A grating element and its support is provided positioned concentrically within the bowl 28 and is rotatable by the motor 6. This element comprises a shaft 38 having, at one end thereof a bore 39, into which the motor shaft 6 slidably fits, and an axial slot 41 which engages the pin 8 and locks the shaft 38 to the motor shaft. The upper end of the shaft 38 is provided with a shouldered extension shaft 42 having a nut 43 threadedly engaged therewith and a pair of washers 44. Between the washers is secured the end plate 46 of a greater element, the cylindrical portion 47 of which is axially concentric with the shafts 7 and 42 and is provided with a plurality of spaced apertures 48 pierced outwardly from the axis of the greater to provide, on the surface of the latter, a plurality of ragged-edged protuberances 49.

The device of my invention is particularly intended for use in bakeries or confectionaries, where large amounts of grated fruit rind are made for flavoring purposes, and is capable of processing a large amount of fruit in a short space of time.

In operation, the cover 33 is removed from the top of the device and a plurality of lemons 51, oranges, or other fruits to be grated, are placed in the bowl as shown in the figure and the cover is replaced. Due to the downwardly and inwardly sloping curvature of the bowl the fruit will be urged by gravity into contact with the surface of the grater element and the protuberances 49 thereon. The motor 6 is now energized which will cause rapid rotation of the grater element, the protuberances of which will tear small fragments of the rind from the fruit. Due to the surface of the fruit being in contact at spaced points on the periphery thereof, with the bowl surface and that of the greater element, the fruit will be caused, by the rotation of the element, to planetate about the latter, thus making the fruit gyrate in its path of travel around the bowl and causing all portions of its surface to come in contact with the protuberances 49 which will remove all of the rind. The progress of the grating may be observed by the operator through the open top of the cover 33 so that the process may be stopped before an excessive amount of the rind which contains no oil cells, and hence is of no value as a flavoring agent, is removed from the fruit.

The particles of rind which are torn from the fruit are deposited on the bottom of the bowl 28 and the very fine particles pass through the bowl perforations 29 into the underlying pan 22. Thus a segregation of the grated material is obtained, the larger particles which contain a greater amount of flavoring oil being retained in the bowl while the smaller particles of lesser oil content pass below into the pan. After a quantity of the grated material has accumulated in the pan and bowl, the motor is stopped, the cover 33 is removed from the top of the bowl, the grating element is removed by drawing it upwardly out of engagement with the motor shaft, and the bowl and pan are then lifted individually from the housing.

It will be observed that the possibility of the apertures of the grating element becoming clogged with the grated rind is greatly lessened due to the centrifugal force, imposed on any particles which lodge in the apertures by the rapidly rotating grating element, causing the particles to be rapidly dislodged.

Another important feature is that the whirling grating element tends to throw the rind particles radially outwardly so that they impinge against the surface of the bowl above the path in which the fruit is moving about the bowl. This causes the fines to be rapidly passed through the bowl apertures into the pan 22 before the former can pass downwardly below the moving fruit and possibly become packed thereby into the apertures which would soon clog the latter.

The spring mounting of the motor 6 produces another desirable feature in the operation of the device as it not only damps the vibration of the machine as a whole, but also provides a cushion for the grating element which absorbs any shock occasioned by bouncing of the fruit in the bowl and prevents severe gouging of the rind by the protuberances 49.

The ease with which the parts of the machine which contact the fruit may be removed for washing or replacement will be obvious by reference to the drawing.

I claim:

A grating machine comprising a vertically disposed housing having an open end, a pan removably mounted in the end of said housing, said pan having a central aperture therein and a flange rising from the periphery of said aperture, a bowl removably disposed in said pan having a portion thereof spaced from said pan to provide a chamber between said pan and bowl, said bowl having a central aperture therein concentric with the aperture of said pan, a flange rising from the periphery of said bowl aperture and surrounding the flange of said pan aperture, a motor disposed within said housing having a shaft rising into said bowl through the aperture thereof and that of the pan, means for resiliently supporting said motor in said housing, said means comprising a plurality of resilient arms secured at their respective ends to said housing and at a point intermediate their ends with said motor, a pin extending transversely through said motor shaft and projecting beyond the periphery thereof, a grater element shaft having a bore at one end thereof for receiving said motor shaft and an axial notch in which said pin is engaged, a cylindrical grater element carried by said grater element shaft, said element on the cylindrical portion thereof being provided with a plurality of spaced protuberances, and said bowl having apertures therein to permit communication between the interior of said bowl and said chamber.

JOSEPH A. KOHL.